(12) United States Patent
Nash et al.

(10) Patent No.: US 11,932,800 B2
(45) Date of Patent: *Mar. 19, 2024

(54) LOW DENSITY CLOSED CELL COMPOSITE AEROGEL FOAM AND ARTICLES INCLUDING SAME

(71) Applicant: LUKLA INC., Cincinnati, OH (US)

(72) Inventors: Jeffrey Nash, Park City, UT (US); Michael Glenn Markesbery, Portland, OR (US); Rithvik Venna, Broadview Heights, OH (US)

(73) Assignee: LUKLA INC., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/007,072

(22) Filed: Aug. 31, 2020

(65) Prior Publication Data

US 2020/0392411 A1    Dec. 17, 2020

Related U.S. Application Data

(62) Division of application No. 16/032,708, filed on Jul. 11, 2018, now Pat. No. 10,793,777.

(60) Provisional application No. 62/531,058, filed on Jul. 11, 2017.

(51) Int. Cl.
| | |
|---|---|
| *C09K 21/02* | (2006.01) |
| *B01J 13/00* | (2006.01) |
| *B32B 5/18* | (2006.01) |
| *C01B 33/159* | (2006.01) |
| *C08J 9/00* | (2006.01) |
| *C08J 9/35* | (2006.01) |

(52) U.S. Cl.
CPC ............ *C09K 21/02* (2013.01); *B01J 13/0091* (2013.01); *B32B 5/18* (2013.01); *C01B 33/159* (2013.01); *C08J 9/0066* (2013.01); *C08J 9/35* (2013.01); *C08J 2201/03* (2013.01); *C08J 2205/026* (2013.01); *C08J 2205/052* (2013.01); *C08J 2309/02* (2013.01); *C08J 2323/06* (2013.01); *C08J 2323/08* (2013.01); *C08J 2333/00* (2013.01); *C08J 2367/00* (2013.01); *C08J 2375/04* (2013.01)

(58) Field of Classification Search
CPC ........ B32B 2250/02; B32B 2266/0207; B32B 2266/0221; B32B 2266/0242; B32B 2266/025; B32B 2266/0278; B32B 2266/08; B32B 2307/302; B32B 2307/3065; B32B 2307/7145; B32B 2307/72; B32B 2307/724; B32B 2307/732; B32B 2437/00; B32B 2437/02; B32B 2571/00; C01B 33/159; C08J 2201/03; C08J 2205/026; C08J 2205/052; C08J 2309/02; C08J 2333/00; C08J 2367/00; C08J 2375/04; C08J 9/0066; C08J 9/35; C08J 2323/06; C08J 2323/08; C09K 21/02; B01J 13/0091

See application file for complete search history.

(56) References Cited

U.S. PATENT DOCUMENTS

| | | | | |
|---|---|---|---|---|
| 4,525,490 | A * | 6/1985 | Smith | C08G 18/10 521/902 |
| 6,040,375 | A | 3/2000 | Behme et al. | |
| 6,121,337 | A * | 9/2000 | Hammel | C08J 9/146 521/131 |
| 10,793,777 | B2 | 10/2020 | Nash et al. | |
| 2007/0187443 | A1 * | 8/2007 | Swartz | A45F 5/02 224/148.4 |
| 2010/0313507 | A1 * | 12/2010 | Castro | E04B 1/26 52/309.4 |
| 2014/0128488 | A1 * | 5/2014 | Lotti | B29C 44/32 521/76 |

FOREIGN PATENT DOCUMENTS

| | | |
|---|---|---|
| EP | 2726544 A2 | 5/2014 |
| WO | 2014188183 A1 | 11/2014 |

OTHER PUBLICATIONS

International Searching Authority, International Search Report and Written Opinion issued in related Application No. PCT/US2018/041630 dated Sep. 27, 2018, 12 pp.

ZOTEK® High Performance Foams and ZOTEK® 30 PVDF Foams Product Specification Sheet, www.zotafoams.com, Dec. 2010, 2 pp.

* cited by examiner

*Primary Examiner* — Christopher M Rodd

(74) *Attorney, Agent, or Firm* — Wood Herron & Evans LLP

(57) ABSTRACT

A composite foam is provided having silica aerogel particles dispersed in a closed cell polymeric foam. The silica aerogel particles are included in a volume fraction between 2 and 60%, and the composite foam has a thermal conductivity of 40 mW/m•K or less and a density of 60 kg/m$^3$ or less. In another embodiment, a composite foam is provided having a perforated closed cell polymeric foam and 2-60% hydrophobic silica aerogel particles by volume with a particle size distribution of 1 to 50 μm, where the composite foam has a thermal conductivity of 30 mW/m•K or less, a density of 20-45 kg/m$^3$, and an air permeability of 20-40 cubic feet per minute.

22 Claims, No Drawings

LOW DENSITY CLOSED CELL COMPOSITE AEROGEL FOAM AND ARTICLES INCLUDING SAME

CROSS-REFERENCE TO RELATED APPLICATIONS

This application is a divisional application of U.S. application Ser. No. 16/032,708 filed Jul. 11, 208, which claims the benefit of and priority to prior filed Provisional Application Ser. No. 62/531,058, filed Jul. 11, 2017, the disclosures of which are incorporated herein by reference in their entirety.

FIELD OF THE INVENTION

The present invention is generally related to the field of composite foam and articles including same such as softgoods articles.

BACKGROUND OF THE INVENTION

Use of aerogels for thermal insulation and the low thermal conductivity of aerogels is well known. Favorable thermally conductive properties result from the very high porosity of aerogel and the small pore size of aerogel material. Insulation having larger pore sizes, such as foam, batting, wool, and other common thermally insulating materials, has a higher thermal conductivity than aerogel. However, traditional methods of producing aerogels are time consuming and expensive. Further, using powder aerogel in the form of a blanket is known but is not desirable due to the extensive dusting which makes installation, handling, forming and shaping particularly difficult, and further raises safety issues. Even with formability issues solved, which may be achieved at high expense and low capacity, closed cell composite foams are heavy, which is not ideal for use in many applications, such as personal protective equipment (PPE). Additionally, the heavy aerogel material foams can have poor breathability, i.e., low air permeability. There is a need for low conductivity insulating materials that are lighter and that overcome problems inherent in aerogel powders and composites, such as the expense of formability of aerogel powder and the lack of flexibility and breathability of composites, as well as the shedding or dusting of aerogel particles upon application of mechanical stress.

SUMMARY OF THE INVENTION

Embodiments of the present invention are directed to a low density closed cell composite aerogel foam in substrate form comprising silica aerogel/polymer composites and articles including same such as softgoods articles. In an embodiment, a composite foam includes silica aerogel particles dispersed in a closed cell polymeric foam. The composite foam includes the silica aerogel particles in a volume fraction between 2 and 60%, and has a thermal conductivity of 40 mW/m•K or less and a density of 60 kg/m³ or less. In another embodiment, a composite foam comprises a perforated closed cell polymeric foam and 2-60% hydrophobic silica aerogel particles by volume having a particle size distribution of 1 to 50 μm, wherein the composite foam has a thermal conductivity of 30 mW/m•K or less, a density of 20-45 kg/m³, and an air permeability of 20-40 cubic feet per minute.

DETAILED DESCRIPTION

All percent values herein refer to percent by volume unless otherwise specified. All numerical values provided herein are numbers of approximation, with no intent to be strictly limited to the exact numerical value. The terms "increased thermal resistance" and "decreased thermal conductivity" are used interchangeably because they are inverse properties of each other. Micron refers to a micrometer, μm. The d(10) is the particle size at which 10% of the volume distribution of particles have a size less than this value. The d(50) is the size of the particle that 50% of the volume distribution is smaller than and 50% of the volume distribution is larger than, i.e., the median particle size. The d(90) is the particle size at which 90% of the volume distribution of particles have a size less than this value.

In accordance with embodiments of the invention, a composite foam is provided in substrate form, such as sheet form or block form. Rather than a viscous composite that is coated onto a substrate, the composite foam of embodiments of the invention is in a non-viscous, substrate form, which may be used by itself or laminated to another substrate, such as a textile.

The composite foam is created by a mixture of silica aerogel particles and a foamed polymer matrix that is optionally perforated. By way of example and not limitation, a standard foaming process using a blowing agent may be used. Any foaming method, including known or proprietary methods, may be used. The polymer matrix may have a polyolefin base polymer such as a polyethylene (PE) base. Other suitable base polymers include polyurethane (PU), EVA (ethylene vinyl acetate), nitrile butadiene rubber, or acrylic. The foam may be ester- or ether-based and may include aliphatic or aromatic structures. The silica aerogel particles decrease the thermal conductivity of the composite foam thereby enhancing the ability of the composite foam to insulate more effectively. Accordingly, the composite shows improved insulating properties (e.g., higher thermal resistance, and conversely, lower thermal conductivity). Advantageously, the aerogel particles are amorphous silica particles having a porosity of 95% or greater. The particles are advantageously hydrophobic, which may include subjecting hydrophilic particles to a surface treatment that renders the composite substrate hydrophobic.

The composite foam is low density and closed cell for use in substrate form in various articles such as softgood products including apparel, footwear, camping equipment, and other sporting equipment. Increased thermal performance provides two primary benefits to the final end product or user of such product. First, the increased thermal performance provides added insulation to the softgood product to provide thermal comfort against cold environmental temperatures. Second, the increased thermal performance provides resistance to contact with surfaces of extreme environmental temperatures. The composite foam slows the heat transfer of the extreme external environment through the softgood product and to the user. This provides protection to the user. The composite foam may be included in personal protective equipment (PPE).

The composite foam is closed cell to minimize moisture absorption, and low density to provide a lightweight composite foam. The closed cell composite foam density is 60 kg/m³ or less, and advantageously 50 kg/m³ or less, and more advantageously 40 kg/m³ or less (per ASTM D1667). By way of example, the density may be between 10 kg/m³ and 60 kg/m³, between 15 kg/m³ and 55 kg/m³, between 20 kg/m³ and 45 kg/m³, between 25 kg/m³ and 50 kg/m³, or between 30 kg/m³ and 40 kg/m³. On one embodiment, the composite foam is perforated, which provides air permeability and thus breathability. The air permeability is 5-60 cubic feet per minute (CFM), for example 20-40 CFM, and the perforations are advantageously micro-perforations of diameter 1 mm or less, for example, 0.3-1 mm.

Aerogel particles can be obtained from any commercial source, including for example Cabot Corporation, Svenska Aerogel, and Aspen Aerogel. By way of example and not limitation, Enova® Aerogel IC3110 from Cabot Corporation (particle size 0.1-0.7 mm), Enova® Aerogel IC3100 from Cabot Corporation (particle size 2-40 mm), or Quartzene® Z1 from Svenska Aerogel (particle size 1-40 mm) may be used. The aerogel particles may have a particle size distribution ranging from 0.1-100 microns, 0.5-70 microns, 1-50 microns, 1-30 microns, 1-10 microns, 10-40 microns, 20-30 microns, or 30-50 microns. The median particle size may be on the order of 2-10 microns, 2-7 microns, 4-10 microns, 3-8 microns, or 4-6 microns. In one embodiment, the aerogel particles have a particle size distribution of 0.5-50 microns with a d(10) in the range of 1-3 microns, a d(90) in the range of 8-30 microns, and a d(50) in the range of 2-7 microns. In one example, the aerogel particles have a particles size distribution of 1-40 microns with a d(10) of ~2 microns, a d(50) of ~4-6 microns, and a d(90) of ~10-14 microns. The pore size distribution in the aerogel particles may be on the order of 1-50 nm, and the surface area ($S_{BET}$) may be on the order of 200-350 $m^2/g$. The aerogel particles may be included in the composite material at a volume fraction from 2-60%, 3-40%, 4-30%, 20-60%, 20-40%, 30-50%, or 40-60%.

To ensure chemical compatibility or to ensure the performance of the aerogel additives, the aerogel particles may be treated in some manner to add physical or chemical functionality. For example, the aerogel particles may be treated to render the composite substrate hydrophobic, thereby increasing the water resistance of the composite foam. The aerogel particles may be treated or processed into the base polymer. In one embodiment, the aerogel particles are physically blended into a polymer matrix and then the mixture is foamed and extruded to form the substrate. To prevent silica dust during mixing, a master batch process may be used in which a slurry is first created with silica aerogel particles using a solvent, such as isopropyl alcohol. The slurry is then mixed with a waterborne polymer dispersion. Alternatively, an enclosed vessel may be used for mixing to eliminate the need for first creating the silica aerogel slurry.

The polymeric matrix may be an aqueous polyurethane solution but may also include polyester, nitrile butadiene and acrylic solutions plus their solvent-based counterparts. Further, the composite formulation may include one or more blowing agents. Any commercially available polymeric matrix material may be used. Additionally, any known blowing agent may be used. The polymeric matrix may be foamed prior to adding the aerogel particles, or after adding the aerogel particles.

The composite foam may optionally include flame inhibiting chemicals for use in PPE or other articles that may be exposed to extreme heat conditions such as from fire or explosives. Such articles may be used by firefighters or other first responders, military personnel, or for camping equipment such as tents for protection from forest fires or user flame sources.

The composite foam may optionally include anti-microbial agents to impart anti-microbial performance to an article incorporating the composite foam layer. For example, the anti-microbial agent may prevent the foam from growing or propagating microbes from human contact. In another example, the anti-microbial agent may kill microbes and prevent their spread.

The thermal performance of the composite foam is determined by measuring the thermal conductivity or thermal resistance using a variety of methodologies. Performance gains are compared against a polymeric foam layer without the addition of aerogel particles in the foam layer. Effective thermal performance gains may be at least 20%, or at least 30%, or at least 40%, or at least 50% greater than the reference material. For example, the addition of aerogel particles may be effective to decrease thermal conductivity of the composite foam by at least 30% compared to the foamed polymer. According to an embodiment, a composite foam layer exhibits a thermal conductivity of 40 mW/m•K or less, such as 35 mW/m•K or less, or 30 mW/m•K or less (per ASTM C518 @0.3 psi).

The composite foam is closed cell to minimize moisture absorption for wearing apparel and personal equipment. In an embodiment, the hydrophobicity of the composite foam is enhanced by treating the silica aerogel particles for hydrophobicity making the foam water-resistant as measured by water absorption of less than 0.1% by volume, from 0.01 to 0.1 by volume, from 0.025 to 0.075 by volume, or from 0.01 to 0.05 by volume (per ASTM D1171). The treatment may be a chemical treatment to increase the hydrophobicity such as a treatment with one or more fluorinated compounds.

The composite foam is provided in substrate form, such as sheet form or block form. Rather than a viscous composite that is coated onto a substrate, the composite foam disclosed herein is in a non-viscous, substrate form, which may be used by itself or laminated to another substrate, such as a textile. To that end, the composite foam may be extruded in blocks or sheets and may be skived to a final thickness. The average thickness may be greater than 0.5 mm, and advantageously 1.5 mm or greater. Further, the average thickness may be less than 10 mm, and advantageously 6 mm or less. By way of example and not limitation, the average thickness may be from 1.5 to 6 mm, 1.5 to 4 mm, or 2 to 3 mm.

In an embodiment, the composite foam is perforated to add air permeability and moisture vapor permeability. Air and moisture vapor permeability may be advantageous in some applications, such as apparel. To maintain the thermal insulation, the perforations may be micro perforations with a diameter of 1 mm or less, or between 0.3 mm and 1 mm. The perforations are advantageously incorporated in a size and amount effective to provide air permeability of 5-60 cubic feet per minute (CFM), for example 20-40 CFM (per ASTM D737). Below 5 CFM, the composite foam is not considered breathable, and above 60 CFM, the composite foam becomes too air permeable, which can dramatically decrease thermal performance.

In an embodiment, the composite foam, in substrate form, may be laminated on the face and/or back surfaces with a textile for the purpose of, for example, increased mechanical strength, moisture management, softness or wearing comfort, and environmental protection (e.g., wind and water resistance). For example, a sheet of composite foam may be laminated to a textile to line the interior surface or the exterior surface or both of the textile to protect the wearer of the article of clothing from wind, rain, and/or cold temperatures. In another example, a block of composite foam may be laminated to the underside of a shoe lining to provide cushioning comfort, water resistance and frost-bite protection. In other examples, sheets or blocks of composite foam may line the fabric of tents, sleeping bags, backpacks, soft coolers, boots, ear muffs, etc. Laminating the composite foam to a textile simplifies processing and manufacturing, for example, cutting and sewing the material, and also provides additional strength at seams. That being said, it is contemplated that the low density closed cell composite foams discloses herein may be useful in substrate form as the article itself without the need for lamination to another substrate.

The combination of thermal efficiency, low density, low moisture absorption (via closed cell and hydrophobic aerogel particles) and option for air permeability provide for an ideal insulating material in wearing apparel and personal equipment.

This has been a description of embodiments of the present invention along with the various methods of practicing the present invention. However, the invention itself should only be defined by the appended claims.

What is claimed is:

1. A soft good comprising a flexible substrate with a flexible composite foam laminated thereto, the composite foam comprising:
    silica aerogel particles dispersed in a closed cell polymeric foam,
    wherein the composite foam includes the silica aerogel particles in a volume fraction 60% or less, and has a thermal conductivity of 40 mW/m•K or less and a density of 60 kg/m$^3$ or less.

2. The composite foam of claim 1, wherein the density is 50 kg/m$^3$ or less.

3. The composite foam of claim 1, wherein the density is 20-45 kg/m$^3$.

4. The composite foam of claim 1, wherein the density is 30-40 kg/m$^3$.

5. The composite foam of claim 1, wherein the thermal conductivity is 30 mW/m•K or less.

6. The composite foam of claim 1, wherein the silica aerogel particles are hydrophobic.

7. The composite foam of claim 6, wherein a water absorption of the composite foam is 0.1% by volume or less.

8. The composite foam of claim 1, wherein the composite foam has an average thickness between 1.5 to 6 mm.

9. The composite foam of claim 1, wherein the composite foam includes perforations having a diameter of 1 mm or less.

10. The composite foam of claim 1, wherein the silica aerogel particles are included in a volume fraction from 3-40%.

11. The composite foam of claim 1, wherein the silica aerogel particles have a particle size distribution of 0.1-100 microns.

12. The composite foam of claim 1, wherein the silica aerogel particles have a particle size distribution of 0.5-70 microns.

13. The composite foam of claim 1, wherein the silica aerogel particles have a particle size distribution of 1-50 microns.

14. The composite foam of claim 1, wherein the silica aerogel particles have a median particle size of 2-10 microns.

15. The composite foam of claim 1, further comprising a flame inhibiting chemical.

16. The composite foam of claim 1, further comprising an anti-microbial agent.

17. The composite foam of claim 1, wherein soft good comprises one or more of an article of apparel, footwear, tent, sleeping bag, ear muff, backpack, or soft cooler.

18. A soft good comprising a flexible textile with a flexible composite foam laminated thereto, the composite foam comprising:
    a perforated closed cell polymeric foam; and
    2-60% hydrophobic silica aerogel particles by volume having a particle size distribution of 1 to 50 μm,
    wherein the composite foam has a thermal conductivity of 30 mW/m•K or less, a density of 20-45 kg/m$^3$, and an air permeability of 20-40 cubic feet per minute.

19. The composite foam of claim 18, wherein a water absorption of the composite foam is 0.1% by volume or less.

20. The composite foam of claim 18, wherein the composite foam has an average thickness between 1.5 to 6 mm.

21. The composite foam of claim 18, wherein the perforated closed cell polymeric foam includes perforations having a diameter of 1 mm or less.

22. The composite foam of claim 18, wherein the soft good comprises one or more of an article of apparel, footwear, tent, sleeping bag, ear muff, backpack, or soft cooler.

* * * * *